United States Patent
Lang et al.

(10) Patent No.: US 8,122,150 B2
(45) Date of Patent: Feb. 21, 2012

(54) MAXIMIZATION OF SUSTAINED THROUGHPUT OF DISTRIBUTED CONTINUOUS QUERIES

(75) Inventors: Christian A. Lang, New York, NY (US); George Andrei Mihaila, Yorktown Heights, NY (US); Themis Palpanas, Dobbs Ferry, NY (US); Ioana Stanoi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 12/371,715

(22) Filed: Feb. 16, 2009

(65) Prior Publication Data

US 2009/0216694 A1 Aug. 27, 2009

(51) Int. Cl.
*G06F 15/173* (2006.01)
*G06F 7/00* (2006.01)
*G06F 17/30* (2006.01)

(52) U.S. Cl. ........ 709/241; 709/238; 707/713; 707/718; 707/719; 707/720

(58) Field of Classification Search .................. 709/203, 709/226, 231; 705/7, 8; 717/104; 707/713, 707/718–721
See application file for complete search history.

(56) References Cited

U.S. PATENT DOCUMENTS

| | | | |
|---|---|---|---|
| 6,031,984 A * | 2/2000 | Walser | 703/2 |
| 7,370,043 B1 * | 5/2008 | Shelton et al. | 707/690 |
| 7,483,873 B2 * | 1/2009 | Bhattacharjee et al. | 1/1 |
| 7,512,600 B2 * | 3/2009 | Al-Omari et al. | 1/1 |
| 7,574,424 B2 * | 8/2009 | Chowdhuri | 1/1 |
| 7,882,100 B2 * | 2/2011 | Andrei | 707/714 |
| 2006/0277230 A1 * | 12/2006 | Nishizawa et al. | 707/204 |
| 2008/0120148 A1 * | 5/2008 | Narayanan et al. | 705/7 |
| 2008/0168179 A1 * | 7/2008 | Gu et al. | 709/231 |

OTHER PUBLICATIONS

Shneidman, J., "A Cost-Space Approach to Distributed Query Optimization in Stream-Based Overlays," In NetDB, 2005.*
Viglas, S., et al., "Rate-Based Query Optimization for Streaming Information Sources," in SIGMOD Conference, 2002.*
Ahmad, Y., et al., "Network-Aware Query Processing for Stream-based Applications," In *VLDB* (2004), pp. 456-467.
Srivastava, U., et al., "Operator Placement for In-Network Stream Query Processing," In *PODS '05: Proceedings of the twenty-fourth ACM SIGMOD-SIGACT-SIGART symposium on Principles of database systems*, 2005.

* cited by examiner

*Primary Examiner* — Saleh Najjar
*Assistant Examiner* — Tae Kim
(74) *Attorney, Agent, or Firm* — Jon A. Gibbons; Fleit Gibbons Gutman Bongini & Bianco PL

(57) ABSTRACT

A system, method, and computer readable medium for optimizing throughput of a stream processing system are disclosed. The method comprises analyzing a set of input streams and creating, based on the analyzing, an input profile for at least one input stream in the set of input streams. The input profile comprises at least a set of processing requirements associated with the input stream. The method also comprises generating a search space, based on an initial configuration, comprising a plurality of configurations associated with the input stream. A configuration in the plurality of configurations is identified that increases throughput more than the other configurations in the plurality of configurations based on at least one of the input profile and system resources.

20 Claims, 10 Drawing Sheets

MAXIMIZATION OF SUSTAINED THROUGHPUT OF DISTRIBUTED CONTINUOUS QUERIES

CROSS-REFERENCE TO RELATED APPLICATIONS

This application is based upon and claims priority from prior U.S. patent application Ser. No. 11/494,331, filed on Jul. 27, 2006, now U.S. Pat. No. 7,496,683, the entire disclosure of which is herein incorporated by reference.

FIELD OF THE INVENTION

The present invention generally relates to the field of monitoring systems, and more particularly relates optimizing the monitoring system for maximum throughput.

BACKGROUND OF THE INVENTION

Monitoring is increasingly used in various applications such as business performance analytics, RFID tracking, and analyzing signals from financial indicators and strategies. In many monitoring applications events are emitted, stored, and processed by different components. For example, in business performance monitoring streams of events provide real-time information that is processed, analyzed, and aggregated while crossing different layers of abstractions: from the lower IT layer to the highest business layer. Queries can span more than one such layer, while the processing itself is enabled by multiple components: event bus, various correlation engines, and dedicated monitors.

A continuous monitoring query can be deployed in various configurations of the monitoring system for optimizing the monitoring system. Many optimization methods focus on choosing a query configuration that minimizes total latency and/or work. However, minimizing latency and/or work dos not maximize throughput of the system. Also, each operator of a continuous query requires a certain amount of execution time for every incoming data tuple, which leads to an upper bound on the rate at which tuples can be processed. If the input streams exhibit higher rates than the query operators can process, then special mechanisms need to be in place to handle them.

When high input rates represent only short bursts, buffers can be used to temporarily store the overflow of incoming data. If, instead, the high rates have to be supported for a long period of time, then data needs to be purged out of the input to the operators. This approach cannot avoid the deterioration of the quality of query results. One method for determining which events to shed in order to return a high-quality result is load shedding. However, some loss of quality is unavoidable when information is discarded. For some applications any event may contain critical information and reduction in the quality of results still occurs even with load shedding.

Therefore a need exists to overcome the problems with the prior art as discussed above.

SUMMARY OF THE INVENTION

Briefly, in accordance with the present invention, disclosed are a method, system, and computer readable medium for optimizing throughput of a stream processing system are disclosed. The method comprises analyzing a set of input streams and creating, based on the analyzing, an input profile for at least one input stream in the set of input streams. The input profile comprises at least a set of processing requirements associated with the input stream. The method also comprises generating a search space, based on an initial configuration, comprising a plurality of configurations associated with the input stream. A configuration in the plurality of configurations is identified that increases throughput more than the other configurations in the plurality of configurations based on at least one of the input profile and system resources.

In another embodiment a system for optimizing throughput of a stream processing system is disclosed. The system includes at least one information processing system comprising at least one processor and a memory communicatively coupled to the processor. The information system also includes a configuration optimizer for analyzing a set of input streams and creating, based on the analyzing, an input profile for at least one input stream in the set of input streams. The input profile comprises at least a set of processing requirements associated with the input stream. The configuration optimizer also generates a search space, based on an initial configuration, comprising a plurality of configurations associated with the input stream. A configuration in the plurality of configurations is identified by the configuration optimizer that increases throughput more than the other configurations in the plurality of configurations based on at least one of the input profile and system resources.

In yet another embodiment, a computer readable medium for optimizing throughput of a stream processing system is disclosed. The computer readable medium comprises instructions for analyzing a set of input streams and creating, based on the analyzing, an input profile for at least one input stream in the set of input streams. The input profile comprises at least a set of processing requirements associated with the input stream. The method also comprises generating a search space, based on an initial configuration, comprising a plurality of configurations associated with the input stream. A configuration in the plurality of configurations is identified that increases throughput more than the other configurations in the plurality of configurations based on at least one of the input profile and system resources.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Figure 1:
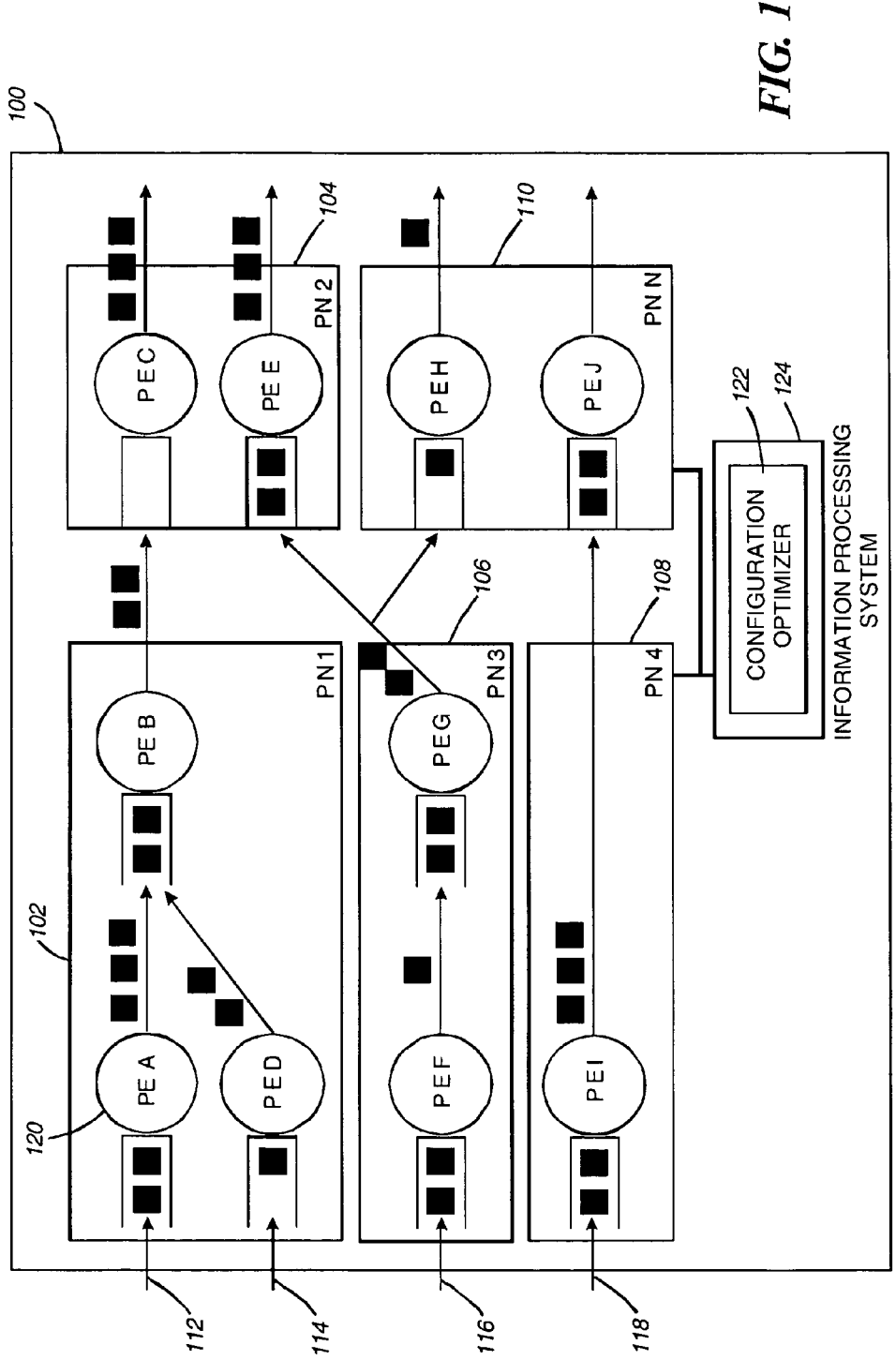
FIG. 1 is a diagram illustrating a distributed processing system, according to an embodiment of the present invention.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information. The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

The following are definitions for various notations used throughout the foregoing discussion.

$o.r_{in}$—the set of input rates into operator o, in terms of tuples per unit of time.

$o.r_{out}$—the output rate for operator o, in terms of tuples per unit of time.

$o.s$—the predicate selectivity for operator o.

$o.w$—the window time-span of operator o.

$o.c$—the cost as number of instructions necessary for operator o to evaluate one tuple.

$o.c_r$—the cost rate of operator o, as a function of processing cost per tuple and rate of input tuples.

$o.col$—the columns associated with operator o.

$N.I$—the processing power of physical node N in terms of instructions per unit of time.

$N.M$—the memory resource of physical node N.

$N.C$—the expression of constraint for node N.

Exemplary Distributed Stream Processing System

According to an embodiment of the present invention, as shown in FIG. 1, an exemplary distributed processing system 100 is shown. FIG. 1 shows various real-time streams 112, 114, 116, 118 entering into the system 100 through a subset of processing nodes 102, 104, 106, 108, and 110. In one embodiment, the distributed processing system 100 is a monitoring system receiving continuous queries over the streams 112, 114, 116, 118. The processing nodes 102, 104, 106, 108, 110 may be co-located, for example within a single cluster, or geographically distributed over wide areas. FIG. 1 also shows applications deployed on the processing nodes 102, 104, 106, 108, 110 as a network of operators, or processing elements ("PE") such as PE A 120. Each data stream 112, 114, 116, 118 is comprised of a sequence of Stream Data Objects (SDOs), the fundamental information unit of the data stream. Each processing element 120 performs some computation on the SDOs received from its input data stream, e.g., select, filter, aggregate, correlate, classify, or transform.

In the context of a monitoring system, each processing node 102, 104, 106, 108, 110 comprises a query operator configuration, which is set of query operators arranged in a specific order on the processing node 102, 104, 106, 108, 110. In one embodiment, a processing node is not limited to a particular query operator configuration. For example, the different query operators can be added or deleted to/from the configuration and the arrangement of the operators can be changed. By placing the query operators throughout the distributed system 100, continuous queries can be performed.

The distributed processing system 100 also includes a query operator configuration optimizer 122. In one embodiment, the query operator configuration optimizer 122 resides on an information processing system 124 that is communicatively coupled to each processing node 102, 104, 106, 108, 110 in the distributed processing system 100. In another embodiment, the query operator configuration optimizer 122 resides on one of the processing nodes 102, 104, 106, 108, 110. The query operator configuration optimizer 122 finds a query configuration that, given resource and quality constraints, can successfully process the highest incoming stream rates. The available resources on a processing node such as CPU and memory are finite and constrained. The rates of input streams can be greater than the rate at which the query operators can process the streams. This causes the data in the input stream to be dropped. Therefore, the query operator configuration optimizer 122 determines an order for the query operators and what processing node to place to operators on so that throughput is maximized taking into account resource and quality constraints. The term "throughput" is a measure that quantifies the number of tuples that can be processed by the distributed processing system 100 in a unit of time. The query operator configuration optimizer 122 is discussed in more detail below.

Exemplary Processing Nodes

Figure 2:
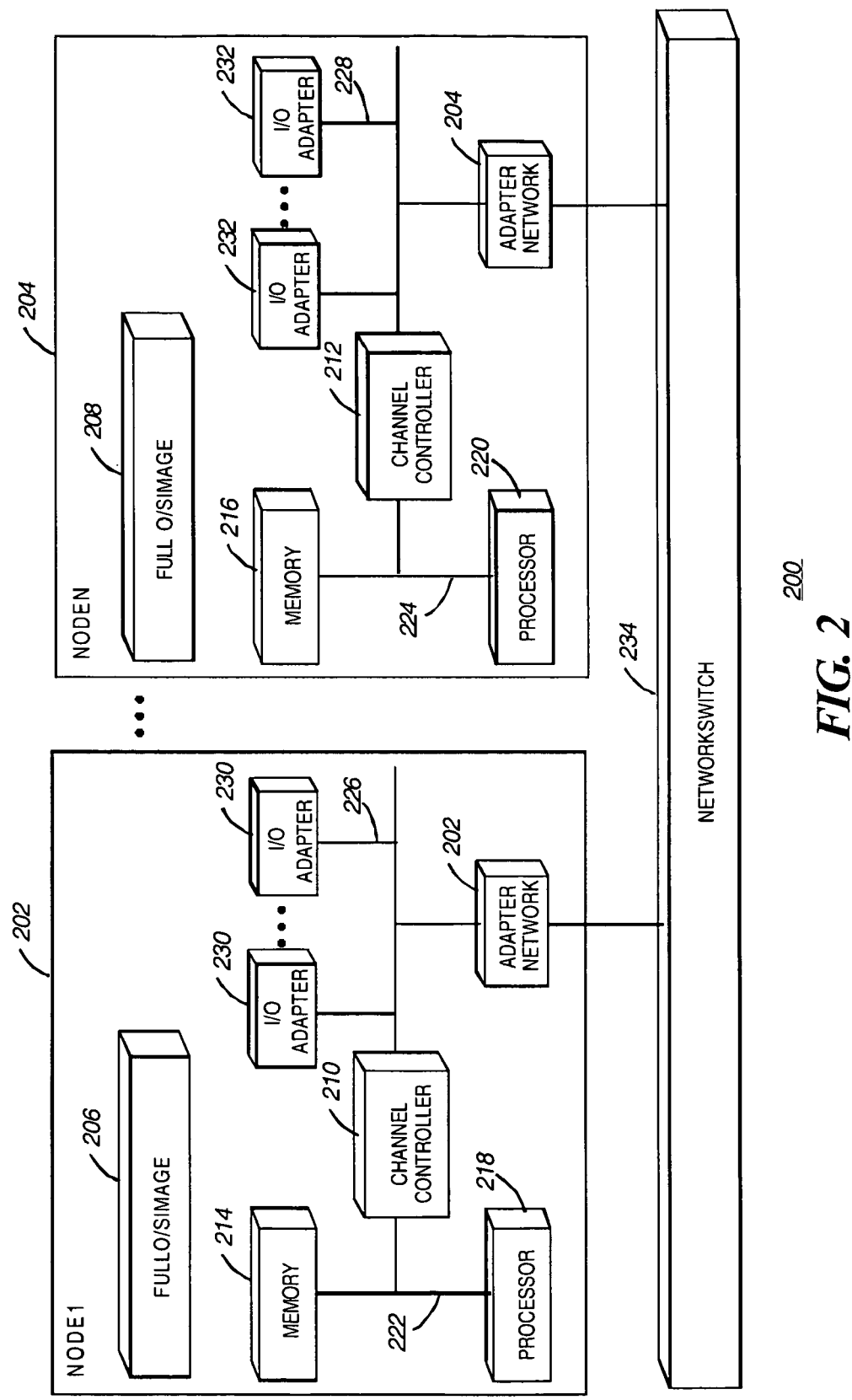
FIG. 2 is a block diagram of processing nodes in the distributed processing system of FIG. 1, according to an embodiment of the present invention.

FIG. 2 is a block diagram illustrating the general architecture of the processing nodes 102, 110 of the distributed processing system 100. In one embodiment, the processing nodes 102, 110 create a SMP computing environment. The processing nodes 102, 110 are coupled to each other via a plurality of network adapters 202, 204. Each processing node 102, 110 is an independent computer with its own operating system image 206, 208, channel controller 210, 212, memory 214, 216, and processor(s) 218, 220 on a system memory bus 222, 224, a system input/output bus 226, 228 couples I/O adapters 230, 232 and network adapter 202, 204. Although only one processor 218, 220 is shown in each processing node 102, 110, each processing node 102, 110 is capable of having more than one processor. Each network adapter is linked together via a network switch 234. In some embodiments, the various processing nodes 102, 110 are able to be part of a processing cluster. All of these variations are considered a part of the claimed invention.

Exemplary Information Processing System

Figure 3:
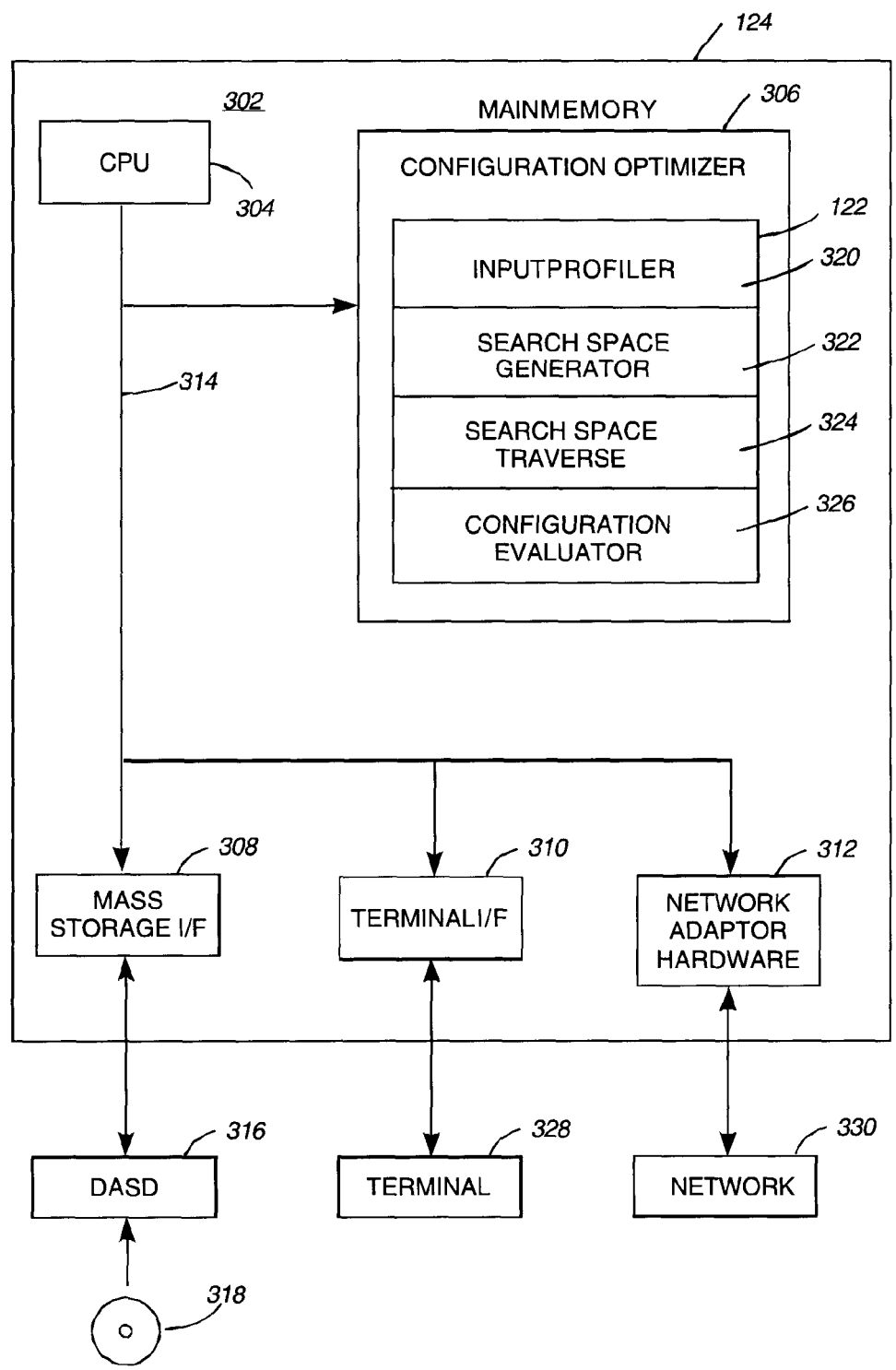
FIG. 3 is a detailed view of an information processing system, according to an embodiment of the present invention.

FIG. 3 is a block diagram illustrating a more detailed view of the information processing system 124 of FIG. 1. The information processing system 124 is based upon a suitably configured processing system adapted to implement the exemplary embodiment of the present invention. Any suitably configured processing system is similarly able to be used as the information processing system 124 by embodiments of the present invention, for example, a personal computer, workstation, or the like. The information processing system 124 includes a computer 302. The computer 302 has a processor 304 that is connected to the main memory 306, mass storage interface 308, terminal interface 310, and network adapter hardware 312 via the system bus 314. The mass storage interface 308 is used to connect mass storage devices such as data storage device 316 to the information processing system 124. One specific type of data storage device is a computer readable medium such as a CD drive, which may be used to store data to and read data from a CD 318. Another type of data storage device is a data storage device configured to support, for example, NTFS type file system operations.

The main memory 306 includes the configuration optimizer 122. In one embodiment, the configuration optimizer 122 is part of a query optimizer (not shown) or can be a separate component from the query optimizer (not shown). The configuration optimizer 122 includes, in one embodiment, an input profiler 320 that profiles the behavior, requirements, and the like of input streams. The configuration optimizer 122 also includes a configuration search space generator 322 for creating a search space of configurations. A search space traverser 324 is also included in the configuration optimizer 122 for identifying each configuration in the space. Each configuration, in one embodiment, is evaluated by a configuration evaluator 326 to determine an optimal operator configuration for maximizing throughput. Each component of the configuration optimizer 122 is discussed in greater detail below.

Although illustrated as concurrently resident in the main memory 306 it is clear that respective components of the main memory 306 are not required to be completely resident in the main memory 306 at all times or even at the same time. In one embodiment, the information processing system 124 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the information processing system 124.

Although only one CPU 304 is illustrated for computer 302 computer systems with multiple CPUs can be used equally effectively. Embodiments of the present invention further incorporate interfaces that each includes separate, fully programmed microprocessors that are used to off-load processing from the CPU 304. Terminal interface 310 is used to directly connect one or more terminals 328 to computer 302 to provide a user interface to the computer 302. These terminals 328, which are able to be non-intelligent or fully programmable workstations, are used to allow system administrators and users to communicate with the information processing system 124. The terminal 328 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown) included in the main memory 306 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 124. The network adapter hardware 330 is used to provide an interface to a network such as a wireless network, WLAN, LAN, or the like. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via a CD/DVD, e.g. CD 318, or other form of recordable media, or via any type of electronic transmission mechanism.

Overview Determining a Configuration for Maximizing Throughput

Figure 4:
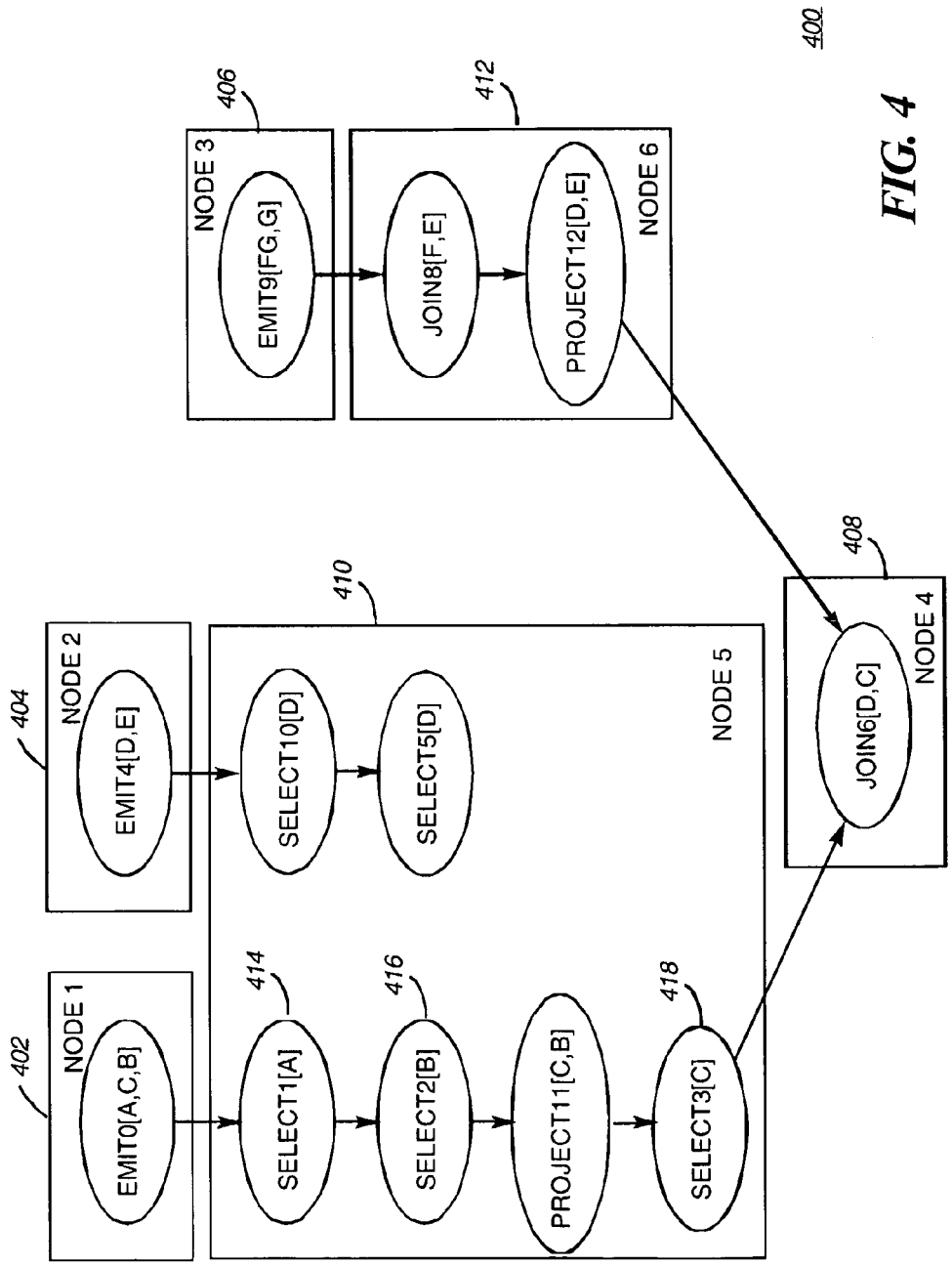
FIG. 4 is a block diagram illustrating an exemplary query operator configuration, according to an embodiment of the present invention.
Figure 5:
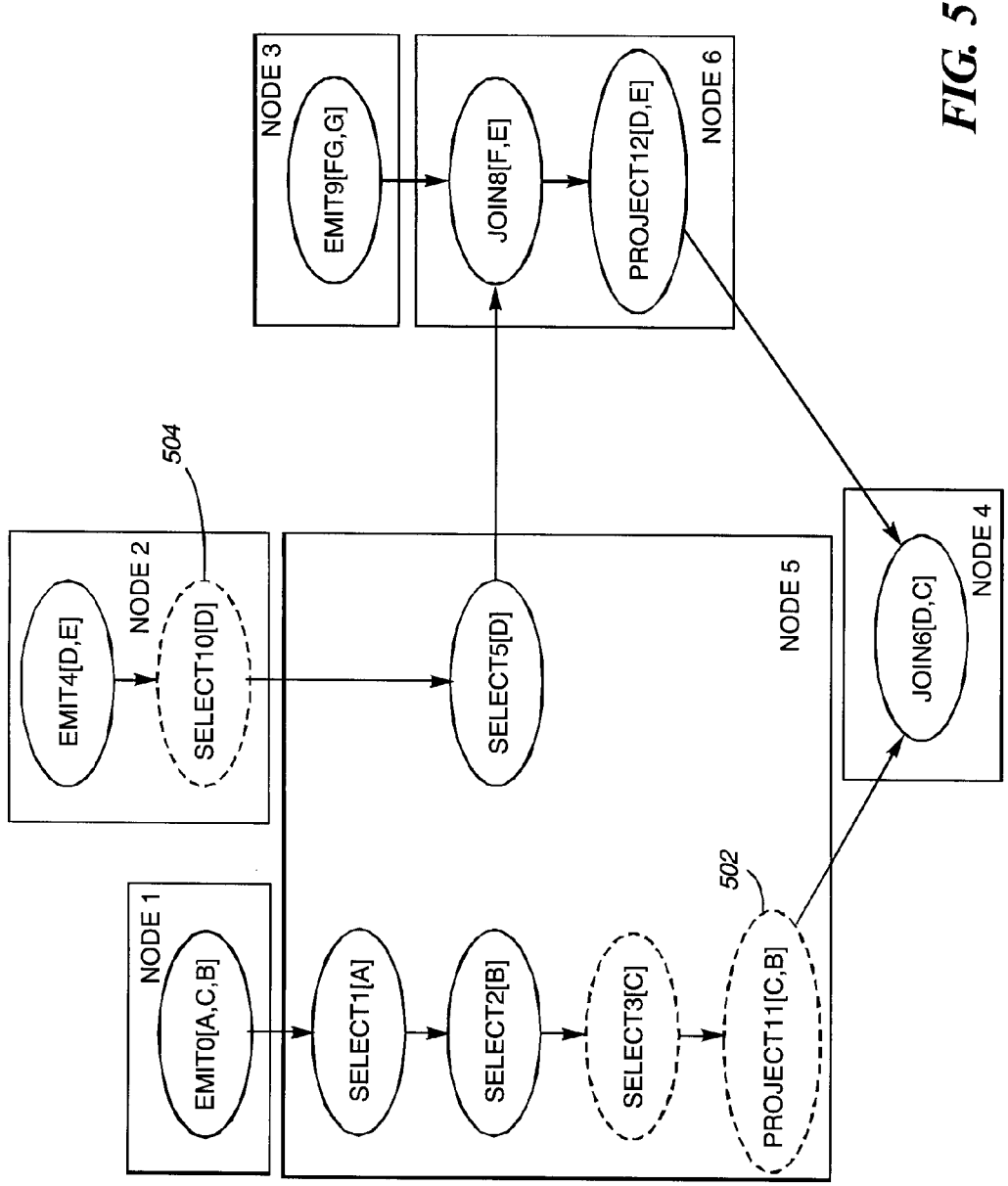
FIG. 5 is a block diagram illustrating an exemplary optimized query operator configuration of FIG. 4 with several of the operators swapped, according to an embodiment of the present invention.

As discussed above, the configuration optimizer 122 determines a query configuration that maximizes a profiled throughput. A configuration of a continuous query is the logical ordering (logical query plan) of operators in a query plan together with their mapping onto physical processors. For example, FIG. 4 shows various query operators such as the SELECT 1[A] 414, SELECT 2[B] 416, SELECT 3[C] 418, and PROJECT 12[D, E] 420 as logical nodes residing on each processing node 402, 404, 406, 408, 410, 412. The ordering (logical query plan) of the operators 414 and their placement on a processing node 402, 404, 406, 408, 410, 412 is one configuration. In one embodiment, the configuration optimizer 122 maximizes the throughput of the distributed system 400 with respect to a continuous query by altering the operator order and/or their placement on processing nodes. For example, the configuration optimizer 122 may determine that based on a throughput profile for the continuous query and the resource constraints of the distributed processing system 400, that the configuration of the operators 414 in FIG. 4 needs to be changed For example, FIG. 5 shows an exemplary optimal configuration determined by the configuration optimizer 122 where several of the operators of FIG. 4 have been swapped. In FIG. 5, the logical order of the SELECT 3[C] 418 and PROJECT11 [C,B] 502 operators in FIG. 4 have been switched and the physical placement of the SELECT 10[D] 504 in FIG. 4 was changed from Node 5 to Node 2. The configuration optimizer evaluates various configurations to determine the configuration that maximizes the throughput the best. The evaluation process is discussed in more detail below.

It should be noted that SQL operators are only used as an example and the present invention is applicable to any type of query operators as would be understood by those of ordinary skill in the art in view of the present discussion. The flexibility of logical permutations between operators, in one embodiment, depends on the commutativity between the operators. Also, the choice in the physical placement of the operators on processing nodes depends, in one embodiment, on the cost of these operators and on the particular query capabilities on the respective processing node, which defines its ability to process the operator.

For a given set of (monitoring) continuous queries and a system configuration, the configuration optimizer 122 analyzes the system capacity with respect to the given queries to determine a query operator configuration that maximizes the throughput of the system. In other words, the configuration optimizer 122 maximizes the input rate that can be processed without bottlenecks occurring. As discussed above, throughput is the number of tuples that can be processed by the system 100 in a given unit of time. Also as discussed above, the configuration optimizer 122 includes an input profiler 320 that represents throughput as a vector that quantifies the processing of each input stream. The input profiler 320 also creates input profiles for each input stream that represent the behavior and knowledge of each input stream. In other words, the input profile 320 captures the requirements (e.g. processing requirements) of the input stream. The input profile captures the relative ratios between the rates of all input streams. A profiled throughput, in one embodiment, is an assignment of rates to the input streams that matches the profile (i.e. the ratios are preserved).

In one embodiment, the query configuration optimizer 122 not only determines the optimal query operator configuration for maximizing throughput but also takes into consideration various system constraints such as memory, latency, work, and the like when determining an optimal configuration. It is important to note that maximizing throughput is not the same reducing latency or work. For example, throughput, as defined above, is the number of input tuples that can be processed by the system in a given unit of time. Latency measures the maximum time it takes for all operators on a path to process an input tuple and work is the number of instructions needed to process a given input rate, per time unit.

The differences between maximizing throughput and work/latency can be seen in the following example. Consider two SELECT operators $o_1$ and $o_2$ with selectivities $o_1.s$ and $o_2.s$ respectively, and costs $o_1.c$ and $o_2.c$ in number of instructions necessary to process a tuple. The placement of $o_1$ on node $N_1$ and $o_2$ is on node $N_2$ is represented as configuration $C_1$. A second configuration $C_2$ changes the physical placement of the operators in $C_1$. In one embodiment, the latency of an operator is calculated as the ratio of the number of instructions necessary to process a tuple to the speed of these instructions. In the first configuration, $C_1$, total latency is the sum of the latencies of both operators: $o_1.c/N_1.I + o_2.c/N_2.I$. Calculations of latencies of $C_2$ are similar, and the results are summarized in Table 1 below.

TABLE 1

| | Optimization Goals | | |
|---|---|---|---|
| Optimization Type | Configuration $C_1$ | Configuration $C_2$ | Affected by . . . |
| Latency | $\dfrac{o_1 \cdot c}{N_1 \cdot I} + \dfrac{o_2 \cdot c}{N_2 \cdot I}$ | $\dfrac{o_1 \cdot c}{N_2 \cdot I} + \dfrac{o_2 \cdot c}{N_1 \cdot I}$ | Physical plan |
| Work | $r \times (o_1 \cdot c + o_1 \cdot s \times o_2 \cdot c)$ | $r \times (o_1 \cdot c + o_1 \cdot s \times o_2 \cdot c)$ | Logical plan |
| Throughput | $\min\left[\dfrac{N_1 \cdot I}{o_1 \cdot c}, \dfrac{N_2 \cdot I}{o_1 \cdot s \times o_2 \cdot c}\right]$ | $\min\left[\dfrac{N_2 \cdot I}{o_1 \cdot c}, \dfrac{N_1 \cdot I}{o_1 \cdot s \times o_2 \cdot c}\right]$ | Physical and logical plan |

It is important to note that the actual order of operators on a path does not play a role in total latency. By contrast, total work performed by the system only takes into account the logical ordering of operators, while the physical placement of the operators onto nodes does not matter. For the first configuration, $C_1$, the work performed by the first operator is measured in number of instructions/time unit as $r \times o_1.c$. Total work is the work of the two operators, $r \times o_1.c + r \times o_2.s \times o_2.c$. Both latency and work are measures calculated for a given input rate. Unlike latency and work, throughput is affected by both the physical and logical placement of the operators.

Moreover, instead of considering the input rate r set, throughput is used to calculate the biggest r that the system can cope with. The limit on r is due to at least one of the operators becoming a bottleneck. For the query plan in $C_1$, operator $o_1$ can only support an incoming tuple rate bounded by the processing speed $N_1.I$ of the node $N_1$: $r \times o_1.c \leq N_1.I$. Considering only operator $o_1$, the input bottleneck occurs when $r = N_1.I/o_1.c$. The second operator is bounded according to $r \times o_1.s \times o_2.c \leq N_1.I$, where $r \times o_1.s$ is the operator's input rate when the input to the query is r. The input limitation of $o_2$ leads then to a rate of $N_2.I/(o_1 s \times o_2.c)$. Then, the query is only able to cope with the minimum between the possible rates of the two operators:

$$\text{Throughput} = \min\left(\frac{N_1 \cdot I}{o_1 \cdot c}, \frac{N_2 \cdot I}{o_1 \cdot s \times o_2 \cdot c}\right)$$

In one embodiment, throughput is measured by considering the output rate of a query as output throughput. This is different than input throughput, which is the rate at which input tuples are processed by the system. As input throughput increases, output throughput usually increases as well. Output throughput also depends not only on the input throughput, but also on the selectivity of the operators. If selectivities vary, then the ratios of input to output throughput fluctuates as well.

If input throughput is only considered, information on how the different input streams contribute to the process is lost. This information is critical for optimizing a system where there are differences in the behavior of the streams. Therefore, in one embodiment of the present invention throughput is represented as a vector $\langle r_1, r_2, \ldots, r_i, \ldots r_n \rangle$, where $r_i$ is the number of tuples from input stream i processed in unit of time. Even Using the vector notation for throughput, the comparison between the input throughputs of two query configurations is not always straight-forward. For example, let two configurations support the input streams $r_1, r_2$ and $r_3$ at the maximum rates of $\langle 10t/s, 40t/s, 20t/s \rangle$ and $\langle 40t/s, 10t/s, 20t/s \rangle$ respectively. The sum of all the tuples processed is 70, the same for both configurations. In one embodiment, the query operator configuration optimizer 122 determines that the optimal configuration is the one that maximizes throughput and fits more tightly with the behavior of the input streams. If the observed input rates at one time are <20, 5, 10>, then the first configuration clearly cannot support them, while the second can. In one embodiment, configuration optimizer takes into account the behavior of input streams (e.g. its profile), and applies the throughput maximization problem to this profile.

Maximizing a Profiled Input

In one embodiment, a query may receive input from multiple data streams with different rate fluctuations. One stream may come from a source that rarely emits events, while another stream may be characterized by long bursts of data at very high rates. If configuration optimizer 122 is given even coarse information on the expected input behavior, it can generate a query plan that is appropriate under these assumptions. Receiving this information prevents the configuration optimizer 122 from deciding that the best solution is one that accepts a high input rate on the slower stream and a low input rate on the fast stream. Therefore, in one embodiment, the input profiler 320 creates a profile associated with the inputs of a continuous query that defines the values of the maximum rates that the streams are expected to reach. The profile of the input is then defined as an assignment of values to the input rates that becomes a target for supported throughput:

$$\langle r_1^P, r_2^P, \ldots r_n^P \rangle.$$

In one embodiment, a solution C.S of a configuration is an assignment of values to the input stream rate variables of a given configuration C such that all the constraints are satisfied. The quality $Q^P(C.S)$ of a solution C.S, in one embodiment, quantifies how much the solution achieves towards the goal of maximizing the throughput with respect to the profile. Note that the goal can also be surpassed. For a stream $r_i$ where the maximum rate is expected to reach $r_i^P$, a solution with value $r_i^s$ achieves $r_i^s/r_i^P$ of the goal. The ratio can be greater than 1 if the solution exceeds the goal. The "goodness" of a solution, in one embodiment, is defined as follows:

The quality $Q^P(C.S)$ of a solution C.S with respect to an input profile vector p is defined as $$Q^P(C \cdot S) = \min_{1 \leq i \leq n} \left( \frac{r_i^s}{r_i^P} \right)$$

Note that a configuration has an infinite number of solutions. Consider one solution C.S=$\langle r_1^s, r_2^s, \ldots r_n^s \rangle$. Then all possible C.S'=$\langle r_1^{s'}, r_2^{s'}, r_n^{s'} \rangle$ such that $r_i^{s'} \leq r_i^s$ are also solutions for this configuration. In one embodiment, the configuration is as good as its best solution.

The quality $Q^P(C)$ of a configuration C with respect to an input profile p is calculated as $$Q^P(C) = \max_{C \cdot S}(Q^P(C \cdot S)) = \max_{C \cdot S} \left( \min_{1 \leq i \leq n} \left( \frac{r_i^s}{r_i^P} \right) \right) Q^P(C \cdot S)$$

Under these definitions, the throughput optimization problem becomes the following nonlinear programming problem: the objective function to maximize is $Q^P(C)$, for all configurations C, under the constraints imposed in the distributed system 100 by the physical resources and service quality guarantees. The constraints are discussed in greater detail below. For now, let any constraint be of the form $f(r_1, \ldots, r_n) \leq c$, with the following properties:

f ( ) is a monotonically increasing function c is a constant that measures the capacity of a resource or a quality of service requirement Building a Search Space To find a solution, the configuration optimizer 122, in one embodiment, traverses a search space of configurations, and compares each visited configuration with the configuration that was the best so far. The query operator configuration optimizer 122 includes a search space generator 322 for creating the search space. In one embodiment the search space generator 322 builds the search space by starting with a feasible solution and explores all possible 1-step moves to reach the neighborhood of that configuration. Then the process continues, starting from each of the neighbors of the initial solution and so on until there are no new configurations.

In one embodiment, the concept of a 1-step move is used to build the neighborhood of a configuration. The function that implements a 1-step move over a given configuration C and returns a neighboring configuration is m(C,α). Each configuration created by running m(C,α) is evaluated according to an objective, which in one embodiment is to maximize the profiled throughput measured by $Q^P(C)$, and is assigned a measure using $Q^P(C)$. A neighborhood for a configuration C is created by applying a 1-step move to build a configuration neighbor to C. The neighborhood of a configuration C is therefore defined as: N(C)={C':C'=m(C,α)}. Recall that there are two types of 1-step moves that modify a configuration. A logical move is a swap of two operators under the constraints of the operator's semantics. A physical move is a mapping of a query operator to a different physical node. The balance between the two types of moves is quantified by a parameter a. The method m(C,α) selects a physical move with probability a as follows:

$$m(C, \alpha) = \begin{cases} m_{logical}(C), & \text{if } p \geq \alpha \\ m_{physical}(C), & \text{if } p < \alpha \end{cases}$$

where (p is a random variable uniformly distributed in [0,1]. Physical moves $m_{physical}$ ( ) are straight-forward to implement, given knowledge about the topology and resources of the processing components: the optimizer 122 selects randomly an operator, and maps it to a choice of a physical node different than the current one.

In one embodiment, a 1-step logical move $m_{logical}$ ( ) is implemented as the swap between an operator (TopOp) and its child (BottomOp). In some instances there are constraints that eliminate some of the logical moves from consideration. Also, sometimes a swap may never lead to a better solution, or, depending on the operator columns, it may lead to an infeasible query plan. Table 2 below summarizes the rules for swapping operators.

TABLE 2

Rules for Swapping Operators

| | TopOp $o_t$ | | |
|---|---|---|---|
| BottomOp $o_b$ | SELECT | PROJECT | JOIN |
| SELECT | always | $o_b \cdot \text{col} \subseteq o_t \cdot \text{col}$ | never |
| PROJECT | $o_b \cdot \text{col} \supseteq o_t \cdot \text{col}$ | $o_b \cdot \text{col} \supseteq o_t \cdot \text{col}$ | never |
| JOIN | always | always | always |

It should be noted that the list of logical moves presented here is not exhaustive. There are other logical moves and logical operators such as stream splitting/merging, operator cloning, and the like that can be used.

Traversing the Search Space

Once the search space has been created, a searcher space traverser 324 traverses the search space so that each configuration within the search can be evaluated. In one embodiment, optimizing the query operator configuration of maximizing throughput is NP-hard. Therefore, in this embodiment, hill climbing techniques are used by the search space traverser 324 for traversing through the configurations. The hill-climbing techniques, in one embodiment, use intensification and diversification.

Large search spaces are often traversed using a greedy, local improvement procedure. The procedure starts with an initial configuration and refines it by selecting the best next configuration from the neighborhood of the current configuration until no neighbor is better than the current configuration. This is also called "hill climbing," because the objective function is improved with each iteration (assuming the goal is maximization). However, the drawback of a local improvement method is that, although it finds the top of a "hill," it may be only a local optimum, dependent on the position of the initial configuration. However, the local optimum found may be different from the global optimum. Therefore, to increase the chances to find the global optimum, the search space traverser 324, in one embodiment, implements a search method that uses steps that escape from local optimum by jumping to a random position in the search space.

The search space traverser 324 can accept educated decisions on when and where to escape local optima, as well as when and which inferior intermediate configurations. This information can be based on information gathered in previous iterations. Various hill-climbing techniques (metaheuristics) such as Tabu Search, Reactive Tabu Search, Simulated Annealing, and the like can be used by the search space traverser 324 for traversing the search space. A Greedy algorithm can start from an initial configuration, and then iterate to search for a better configuration until a stopping condition becomes true. At each iteration the neighborhood of the current configuration is explored and the best neighbor is chosen to become the current configuration. Note that since it only accepts local improvements it will find the top of the local hill, it will not explore other hills for a global optimum.

The Tabu Search procedure, which is further described in F. S. Hillier and G. J. Lieberman. In *Introduction to Operations Research, 9th. Edition*. McGraw Hill, 2005 and is hereby incorporated by reference in its entirety, starts from an initial configuration C, and from the neighborhood of s. The Tabu Search procedure only accepts improving configurations C. Through a set of iterations, it finds a local optimum. It then continues to explore the search space by selecting the best non-improving configuration found in the neighborhood of the local optimum. To avoid cycles back to an already visited local optimum, the procedure uses a limited Tabu list of previous moves. In one embodiment, the neighborhood of a configuration s can be denoted as (N,C), and it constitutes the configurations found by trying all the possible moves (M,C), and the Tabu list is T.

Improvements to the basic Tabu Search can be made by implementing intensification and diversification. Intensification is used to explore more the parts of the search space that seem more promising, while diversification enables the procedure to consider configurations in parts of the search space that were not explored previously. A method that employs both intensification and diversification is the Reactive Tabu Search. The Reactive Tabu Search method, which is described in more detail in R. Battiti and G. Tecchiolli. The reactive tabu search. In *Orsa Journal on Computing*, pages 126-140, 1994, and is hereby incorporated by reference in its entirety, builds upon the basic Tabu Search, but emphasizes learning-based intensification and diversification. One enhancement is the fully automated way of adjusting the size of the Tabu list that holds the set of prohibited moves, based on the evolution of the search. Another feature, that enables better diversification, is the escape strategy. Following a threshold number of repetitions of Tabu configurations (notice that configurations are stored instead of moves), the escape movement is enforced. Intuitively, the number of random moves that comprise an escape depends is proportional to the moving average of detected cycles because longer cycles can be evidence of a larger basin and it is likely that more escape steps are required. The Tabu list size increases with every repetition of a Tabu configuration, and it decreases when a number of iterations greater than moving average passed from the last change of the Tabulist size. To keep the size of the Tabu list within limit, it is reduced when it is so large that all movements become Tabu.

Simulated Annealing is another hill-climbing technique that can be used by the search space traverser 324 and is describe in more detail in F. S. Hillier and G. J. Lieberman. In *Introduction to Operations Research, 9th. Edition*. McGraw Hill, 2005 and is hereby incorporated by reference in its entirety, which is hereby incorporated by reference in its entirety. Simulated Annealing is a metaheuristic that is especially good at escaping local minimum. Simulated Annealing focuses first on finding the tall hills, then on climbing them. At the beginning, it has the flexibility of taking steps in random directions, and it increases in time the focus on climbing the hills by reducing the probability to accept a downward move (that leads to an inferior configuration).

In general, the metaheuristics all go through a finite number of iterations, climbing towards a local optimum. At each iteration, they create one or more configurations in the neighborhood of the current solution, and select the next temporary solution. The creation of the candidate configurations is a result of implementing 1-step moves with m(C,α), which are evaluated according to the configuration optimizer's 122 objective of maximizing the most constrained input. In one embodiment the metaheuristics performing searching in, but are not limited to, one or two phases. A 1-Phase procedure enables either one of the metaheuristics (e.g. Tabu Search, Reactive Tabu, Simulated Annealing) using the definition of 1-step moves and evaluation function described above. It should be noted that in this case, each iteration creates new configurations based on either a logical or a physical move.

The 2-Phase procedure employs the heuristics twice: first it searches for a solution by using only logical moves. Then the solution found in the first phase is used as an initial configuration for the second phase, during which it searches for the best physical placement of this query plan.

Configuration Evaluation

The optimizer 122 also includes a configuration evaluator 326 for evaluating each candidate configuration to determine the best solution of the configuration. Each configuration can have an infinite number of solutions that satisfy the given constraints. In one embodiment, the configuration evaluator 326 uses the feasible space to quickly identify the best solution for each configuration. For example, let a query configuration C be restricted by constraints that are of the form $f(r_1, \ldots r_n) \leq c$, where c is a constant and $f()$ is monotonically increasing. For a profile $p = \langle r_1^P, r_2^P, \ldots r_n^P \rangle$ a solution with greatest $Q^P(C.S)$ lies on the surface bounding the region of feasible solutions and on the line through origin and p.

The above proposition can be proven by contradiction. For example, let the solution that is found at the intersection of the bounding curve with the line between origin and profile point p be $S = \langle r_1^s, r_2^s, \ldots r_n^s \rangle$. Then $r_1^s/r_1^P = r_2^s/r_s^P = \ldots = r_n^s/r_n^P$. Assume now that there is another feasible solution $S' = \langle r_1^{s'}, r_2^{s'}, \ldots r_n^{s'} \rangle$ $S' \neq S$ such that $Q^P(C.S') > Q^P(C.S)$. In other words, $\min_{1 \leq i \leq n} r_i^{s'}/r_i^P > \min_{1 \leq i \leq n} r_i^s/r_i^P$. Because $r_1^s/r_1^P = r_2^s/r_2^P = \ldots = r_n^s/r_n^P$, it must be the case that all components of S' are greater than their corresponding components of S: $r_1^{s'} > r_1^s$, $\forall r_1^{s'}$, $1 \leq i \leq n$. Without loss of generality S' can be rewritten as $\langle r_1^s + \delta_1, r_2^s + \delta_2, \ldots r_n^s + \delta_n \rangle$, with all delta$_i > 0$. Since S lies on the bounding curve, then it satisfies at the limit at least one constraint such that $f(r_1, r_2, \ldots r_n) = c$ For solution S' this constraint will be evaluated as $f(r_1 + \delta_1, r_2 + \delta_2, \ldots r_n + \delta_n) > c$. It follows that at least one constraint is not satisfied, and S' is not a feasible solution. The assumption that S' is a feasible solution is contradicted.

Exemplary Constraints Considered During Evaluation

The optimizer 122, in one embodiment, also considers one or more constraints when evaluating configurations to determine the optimal configuration for maximizing throughput. For example, processing resource limitations, memory limitations, bandwidth requirements, latency, and like are all constraints that can be considered by the optimizer 122. As an example, the limitation on processing resources of a node is discussed first. For a processing node $N_j$ with resources $N_j.I$ available for query execution, the combined load of the operators on $N_j$ is limited by $N_j.I$. Typically, the cost o.c of an operator o is characterized by the number of instructions necessary to process one input tuple. Because the optimizer 122 calculates input rates, the corresponding cost rate $o.c_r$ can be defined as a product between input rate and cost, in instructions/sec.

Note that the resource of a node N.C is also measured in instructions/sec. When operators $o_1, o_2, \ldots o_n$ are placed on $N_j$, the constraints $(N_j.C)$ can be expressed as the sum of the cost rates of all operators:

$$\sum_{i=1}^{n} (o_i \cdot c_r) \leq N_j \cdot I$$

$(N_j \cdot C)$

Figure 6:
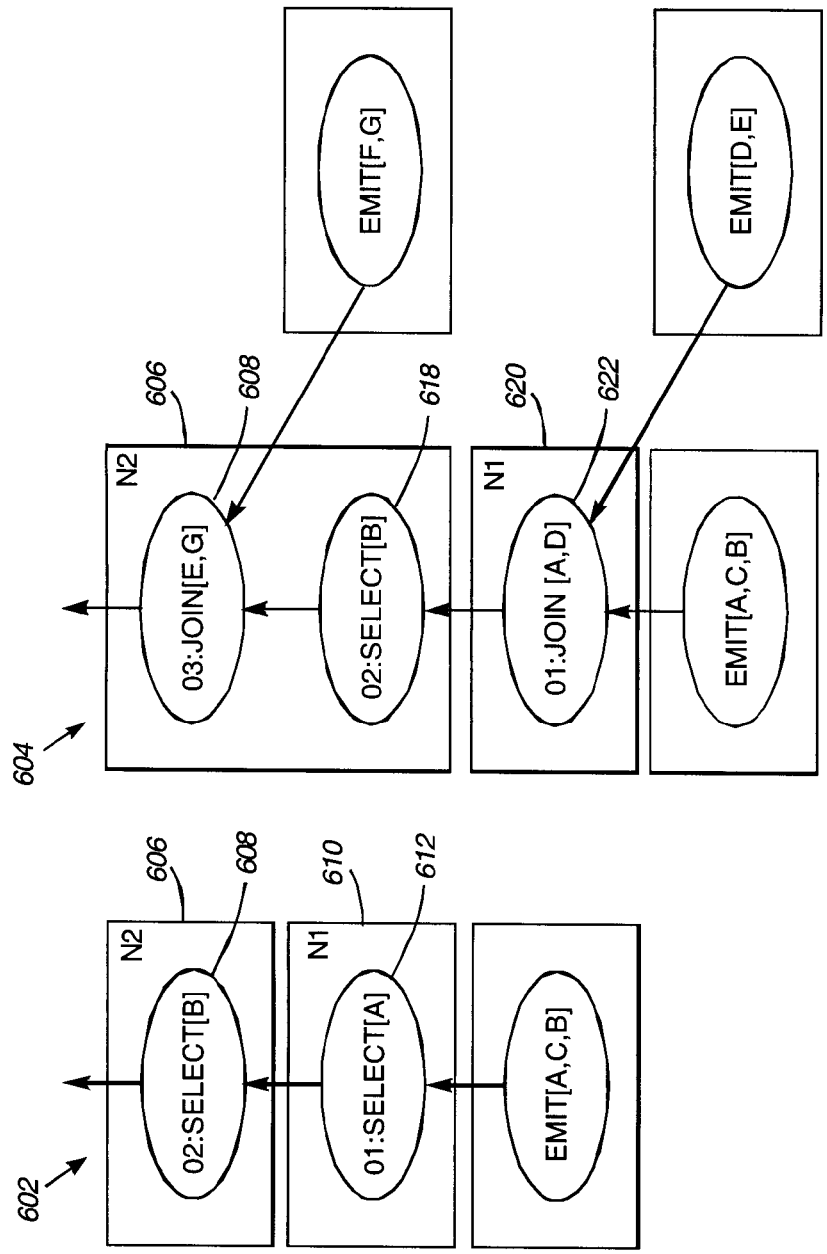
FIG. 6 illustrates two exemplary connected directed graphs of operators representing the flow of tuples/processing through operators in a processing node, according to an embodiment of the present invention.

For each physical node there is one such inequality that expresses the constraint on physical resources of that node and the following example shows how to calculate the cost rates to obtain the constraint expressions. FIG. 6 illustrates two exemplary connected directed graphs 602, 604 of operators representing the flow of tuples/processing through operators in a processing node. It should be noted that there can be multiple such directed graphs. FIG. 6 also shows an example of operator assignments to the physical nodes. For example, the first graph 602 shows the processing node N2 606 having the operator 608 SELECT[B] and the processing node N1 610 having the operator 612 SELECT[A]. The second directed graph shows the processing node N2 614 having the operator 616 JOIN [E,G] and the operator 618 SELECT[B]. The processing node N1 620 in the second directed graph has the operator 622 JOIN [A,D].

Since the input rate of one operator is the output rate of another, the left hand side of $N_j.C$ is a non-linear expression in terms of the input rates into the leaf node of the graph and the cost per tuple of the different operators. The Table 3 below enumerates the rules for computing the cost rate of operators for SELECT, PROJECT and JOIN. In one embodiment, it is assumed a double hash JOIN and a time-based JOIN window, where the output rate $o.r_{out}$ is therefore the rate on the first stream $r_1$ multiplied by the number of tuples in the window of the second stream $(o.w \times r_2)$, plus the rate of the second stream multiplied by the number of tuples of the first stream in the JOIN window.

TABLE 3

Exemplary Rules For Computing o · $c_r$

| Operator | o · $r_{in}$ | o · $r_{out}$ | o · $c_r$ |
|---|---|---|---|
| SELECT | r | r × o · s | o · c × r |
| PROJECT | r | r | o · c × r |
| JOIN | $r_1, r_2$ | 2 × o · w × $r_1$ × $r_2$ × o · s | o · c × ($r_1 + r_2$) |

Constant input rates, in one embodiment, are considered by the configuration optimizer 122 because the goal is to analyze how the system behaves at a maximum rate. This is different than modeling the fluctuating behavior of the system at run-time input rates, as described in S. Viglas and J. F. Naughton. Rate-based query optimization for streaming information sources. In *SIGMOID*, 2002. As an example, let a query of two operators be as illustrated as the first directed graph 602 in FIG. 6. Operator $o_1$ is placed on a node $N_1$ of capacity $N_1.I$, and operator $o_2$ is on $N_2$ of capacity $N_2.I$. Then the configuration is subject to the following constraints:

$o_1.c \times r_1 \leq N_1.I$ $(N_1.C)$ $o_2.c \times o_1.r_{out} \leq N_2.I \Leftrightarrow o_2.c \times (r_1 \times o_1.s) \leq N_2.I$ $(N_2.C)$ As a more complex example, consider the query operators of the second directed graph 604 in FIG. 6. The rate $r_1$ is the rate of data emitted by "EMIT[D,F]", $r_2$ is the rate of tuples emitted by EMIT[A,C,B], and tuples from EMIT[E,G] have a rate $r_3$. In this case, the constraints are:

$o_1 \cdot c \times (r_i + r_2) \leq N_1 \cdot I$ $(N_1 \cdot C)$ $N_2 \cdot I \geq o_2 \cdot c \times o_1 \cdot r_{out} + o_3 \cdot c \times (o_2 \cdot r_{out} + r_3) = o_2 \cdot c \times 2 \times o_1 \cdot w \times$ $o_1 \cdot s \times r_1 \times r_2 + + o_3 \cdot c \times (o_2 \cdot s \times 2 \times o_1 \cdot w \times o_1 \cdot s \times r_1 \times r_2 + r_3)$ $(N_2 \cdot C)$ The constraints can be built by accumulating the terms in a bottom-up traversal of the query graph.

Another constraint that can be considered by the optimizer 122 is memory limitation. Since the goal of the configuration optimizer 122 is to maximize the supported throughput, the configuration optimizer 122, in one embodiment, assumes that operators are able to process tuples fast enough that no additional buffers are necessary. Table 4 below shows that the space required by a SELECT and PROJECT is the size of a tuple $m_t$, while the memory requirement for a JOIN is that of storing tuples that fit in the window size (o.w×$r_1$+$o_w$×$r_2$) and two hash tables (of allocated size h).

TABLE 4

Rules For Computing o · $c_r$

| Operator | Space required for $o_m$ |
|---|---|
| SELECT | $m_t$ |
| PROJECT | $m_t$ |
| JOIN | o · w × $r_1$ × $m_t$ + h + o · w × $r_2$ × $m_t$ + h |

The memory constraints should reflect the fact that the total memory used by all operators in one node should be less than what the node allocates for the execution of the corresponding operators. That is, for each $N_j$:

$$\sum_{i=1}^{n} (o_i \cdot m) \leq N_j \cdot M$$

An additional constraint that can be considered by the configuration optimizer 122 is bandwidth requirements. Bottlenecks arise due to operators that process tuples slower than they are received, and also due to communication link delays. The constraint on a link $L_{i,j}$.C from node $N_i$ to $N_j$ is that the bandwidth $L_{0,1}$.B cannot be less than: (rate coming out of node $N_i$)×(size $m_t$ of tuples). Consider again the example in FIG. 6, the bandwidth constraints are:

$$L_{0,1}.B \geq r_1 \times m_1 (L_{0,1}.C)$$

$$L_{1,2}.B \geq o_1.r_{out} \times m_1 = o_1.s \times r_1 \times m_t (L_{1,2}.C)$$

Another constraint that can be considered by the configuration optimizer 122 is quality of service guarantees (e.g. latency). The maximum latency of a query configuration is given by the total time taken by all operators on the most time-expensive path of the configuration. For an operator o on physical node N, the processing time for one tuple is calculated as o.c/N.I. Let $P_1, P_2, \ldots P_m$ in the set P be all the paths from the leafs to the root of a query configuration tree. Then the requirement that the maximum latency should not exceed a limit L can be written as:

$$\max_{P_i \in P} \left( \sum_{N_j \in P_i} \sum_{o_i \in P_i \cap N_j} \frac{o_i \cdot c}{N_j \cdot I} \right) \leq L$$

Evaluating these constraints efficiently is not straight forward. Finding the values of variables $r_1, \ldots r_n$ that maximize the quality is done, in one embodiment, through evaluating the set of non-linear constraints and the additional constraint due to the profile. In one embodiment, the relationship of the variables imposed by the profile is used to rewrite the resource and latency constraints in terms of only one variable. Then, to solve the nonlinear equations, in one embodiment, a binary search approach is used. For example, if the constraint $N_j$.C can be rewritten $$\sum_{i=1}^{k} (a_i x^j) \leq N_j \cdot I.$$

In one embodiment, the initial value for the high limit is $$\min_{j=1}^{m} \left[ \frac{N_j \cdot I}{a^k} \right]^{1/k}.$$

In the first iteration, the medium mid is plugged into all constraints. If all are satisfied, the next iteration continues after setting low=med. Otherwise high=mid. The algorithm stops when a certain given precision is achieved.

Therefore, in one embodiment, the configuration optimizer 122, for a given query and physical configuration of a system 100, determines the configuration with the largest input rates that match the profiled input behavior. The configuration optimizer 122 builds a search space by starting with a feasible solution and exploring all possible 1-step moves to reach the neighborhood of that configuration. Then the process continues, starting from each of the neighbors of the initial solution and so on until there are no new configurations. Each configuration created by running m(C,α) is evaluated according to an objective, which, in one embodiment, is to maximize the profiled throughput measured by $Q^P$(C), and is assigned a measure using $Q^P$(c).

Exemplary Process of Maximizing Throughput

Figure 7:
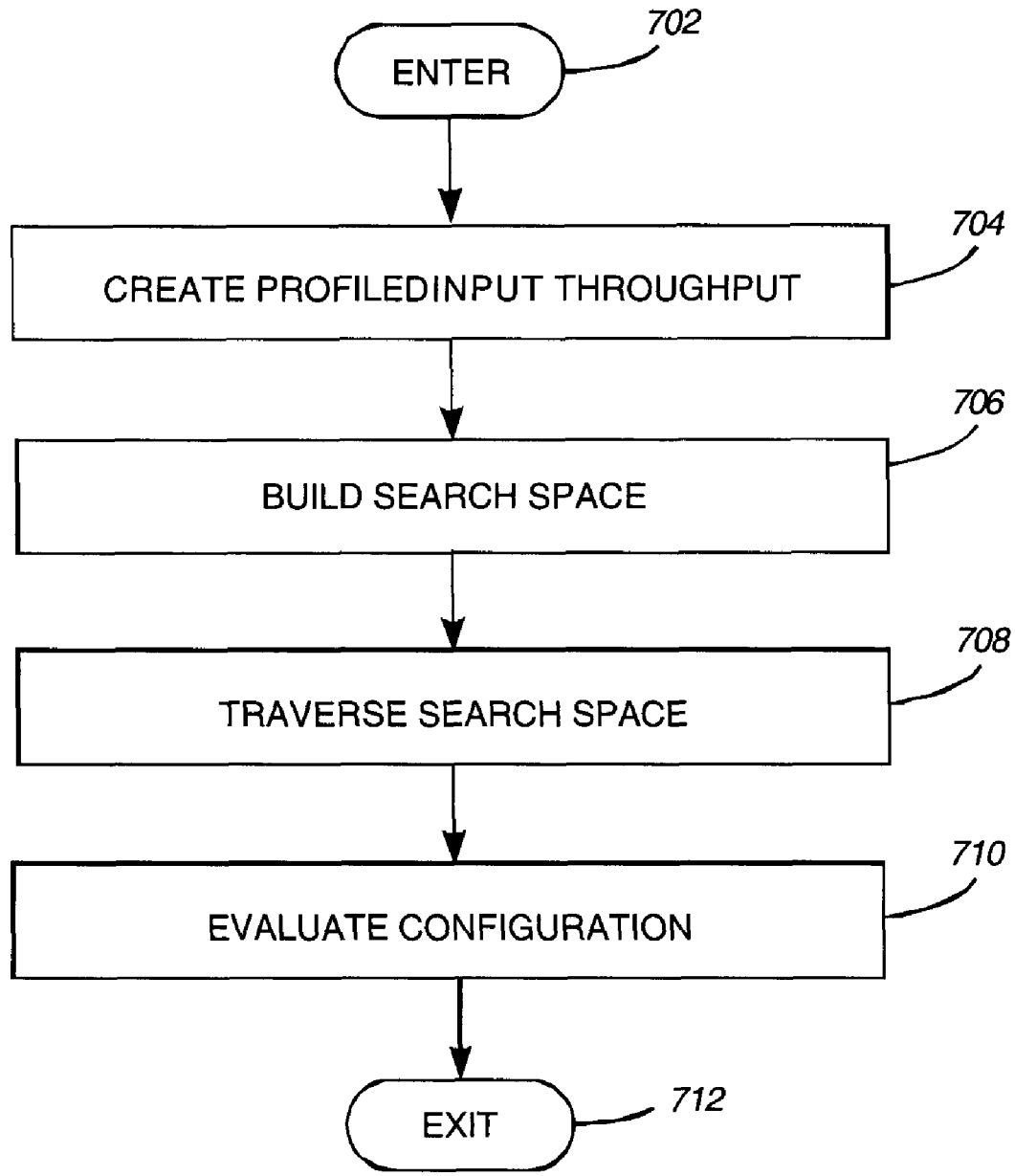
FIG. 7 is an operational flow diagram illustrating an overall process for maximizing throughput of a distributed processing system, according to an embodiment of the present invention.

FIG. 7 illustrates an exemplary overall process of maximizing throughput of the distributed processing system 100. The operational flow diagram of FIG. 7 begins at step 702 and flows directly to step 704. The configuration optimizer 122, at step 704, creates a profile for input throughput for a particular query. For example, the input profile characterizes the expected behavior of the input streams and captures the requirements of the input streams. The configuration optimizer 122, at step 706, builds a configuration search space as part of maximizing a profiled input. The search space, in one embodiment, is built by starting with a feasible solution and explores all possible 1-step moves to reach the neighborhood of that configuration. Then the process continues, starting from each of the neighbors of the initial solution and so on until there are no new configurations. The search space building process is discussed above in the section entitled "Building A Search Space".

Once the search space is created, the configuration optimizer 122, at step 708, traverses the search space to identify each configuration within the search space. In one embodiment, metaheuristics are used to traverse the search space. The search space traversing process is discussed above in the section entitled "Traversing The Search Space". The configuration optimizer 122, at step 710, evaluates each configuration within the search space. Each candidate configuration is evaluated to determine the best solution of the configuration. The configuration with the best solution is selected as the optimal configuration for maximizing throughput. Each configuration can have an infinite number of solutions that satisfy the given constraints. In one embodiment, the configuration optimizer 122 uses the feasible space to quickly identify the best solution for each configuration. The evaluation processes is discussed above in the section entitled "Configuration Evaluation".

Exemplary Process of Building A Search Space

Figure 8:
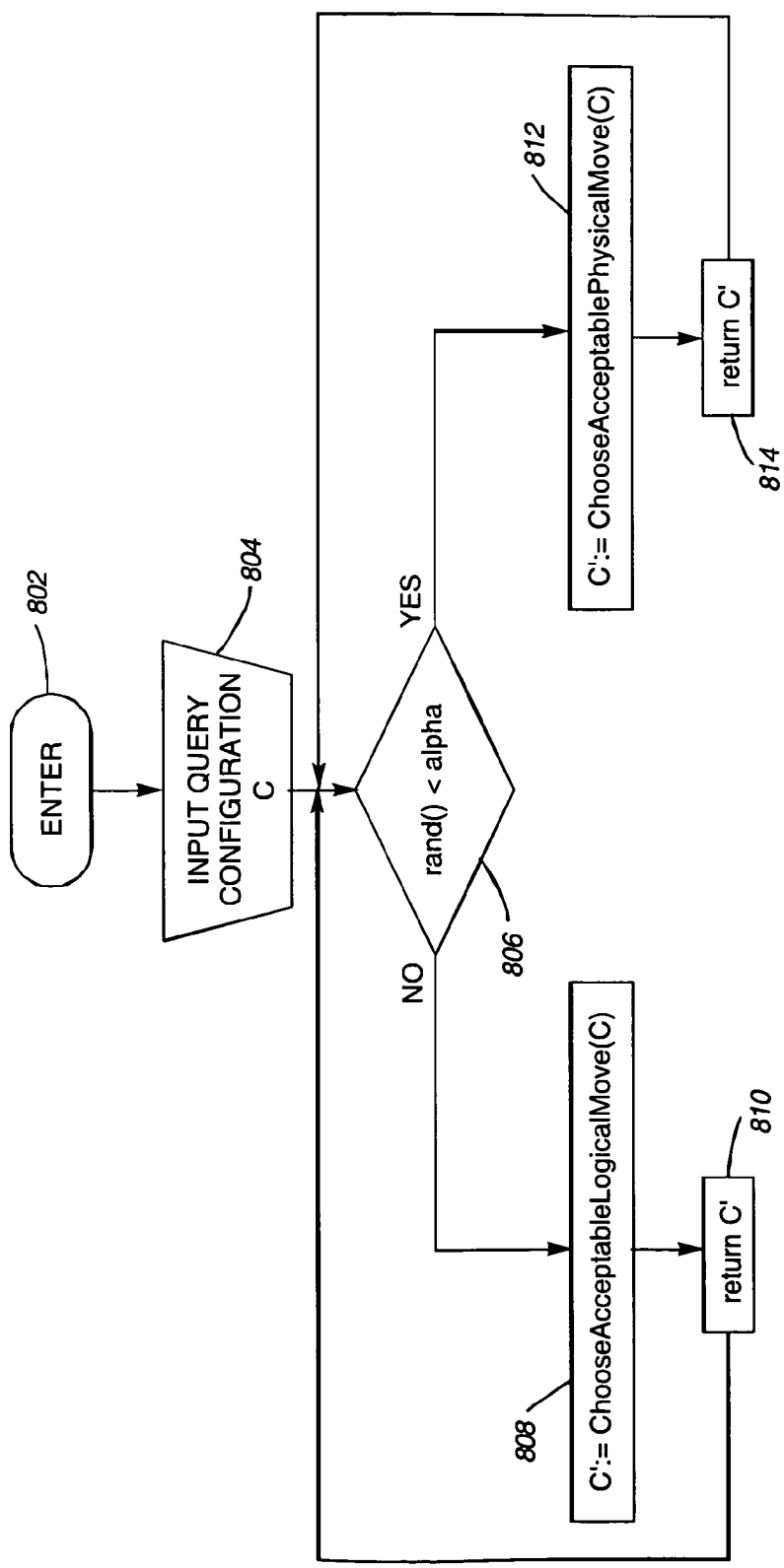
FIG. 8 is an operational flow diagram illustrating an exemplary process of building a search space, according to an embodiment of the present invention.

FIG. 8 is an operational diagram illustrating an exemplary process of building a search space. The operational flow diagram of FIG. 8 begins at step 802 and flows directly to step 804. The configuration optimizer 122, at step 804, selects an input query configuration to build a search space around. The configuration optimizer 122, at step 806, determines if a random variable is less than a parameter alpha. The parameter alpha quantifies the balance between physical 1-step moves and logical 1-step moves, as discussed above in the section entitled "Building A Search Space". In one embodiment, the random variable is uniformly distributed. If the result of the determination is negative, the configuration optimizer 122, at step 808, chooses an acceptable logical move.

A logical move, for example, is a swap of two operators under the constraints of the operator's semantics. An acceptable logical move depends on the metaheuristic being used. The configuration optimizer 122, at step 810, implements the chosen acceptable to move to perform the 1-step move. If the result of the determination is positive, the configuration optimizer 122, at step 812, chooses an acceptable physical move. A physical move is a mapping of a query operator to a different physical node. An acceptable physical move also depends on the metaheuristic being used. The configuration optimizer 122, at step 814, implements the chosen acceptable to move to perform the 1-step move. The configuration optimizer 122 continues to choose logical and physical moves until a sufficient search space is built. In one embodiment, the search space, which includes a configuration and its neighborhood, can be built exhaustively as compared to probabilistically.

Figure 9:
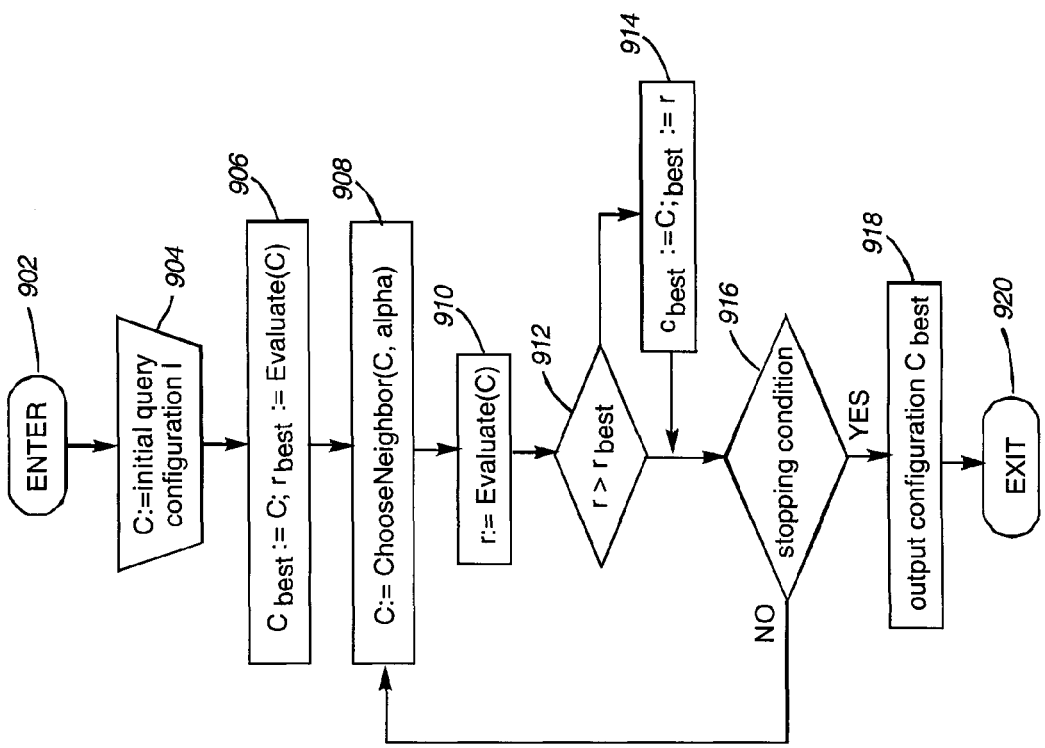
FIG. 9 is an operational flow diagram illustrating an exemplary process of traversing a search space, according to an embodiment of the present invention.

Exemplary Process of Traversing the Search Space to Find an Optimal Configuration FIG. 9 illustrates an exemplary process of traversing the search space to identify an optimal configuration (e.g. the configuration that maximizes throughput). The operational flow diagram of FIG. 9 begins at step 902 and flows directly to step 904. The configuration optimizer 122, at step 904, starts with an initial query configuration. The configuration optimizer 122, at step 906, initially sets the best configuration to the initial configuration and initializes an evaluation algorithm to determine if the configuration is the optimal configuration. The configuration optimizer 122, at step 908, chooses a neighbor of the initial configuration. The configuration optimizer 122, at step 910, evaluates the configuration. The configuration optimizer 122, at step 912, determines if the maximum throughput rate of the evaluated configuration is better than the current most optimal configuration.

Figure 10:
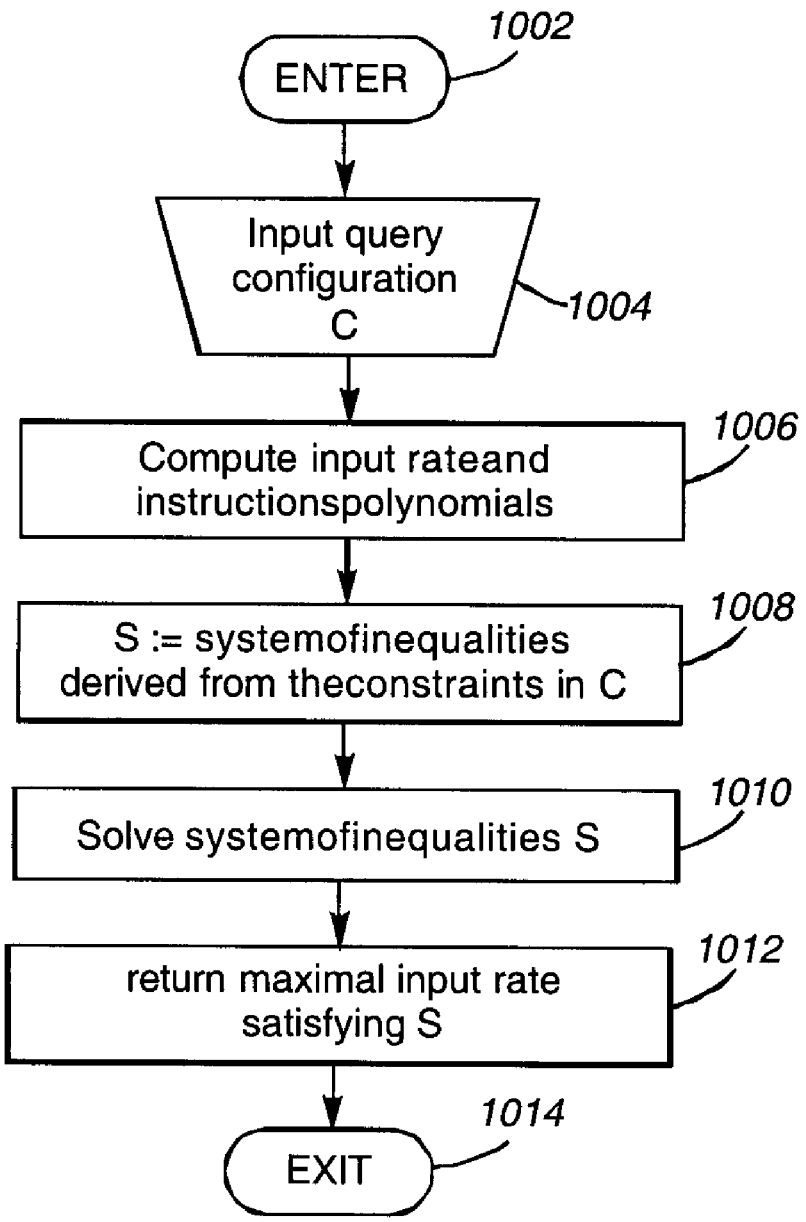
FIG. 10 is an operational flow diagram illustrating an exemplary process of evaluating a query operator configuration, according to an embodiment of the present invention.

If the result of this determination is negative, the control flows to step 916. If the result of the determination at step 912 is positive, the configuration optimizer 122, at step 914, sets the evaluated configuration as the current optimal configuration. The control then flows to step 916. The configuration optimizer 122, at step 916, determines if a stopping condition has occurred. If the result of this determination is negative, the control flows back to step 908, where the configuration optimizer 122 chooses another neighbor of the initial configuration for evaluation. If the result of this determination is positive, the configuration optimizer 122, at step 918, selects the evaluated configuration as the optimal configuration for maximizing throughput. The control flow then exits at step 920. Exemplary Process Of Evaluating A Configuration FIG. 10 illustrates an exemplary process of evaluating a configuration. The operational flow diagram of FIG. 10 begins at step 1002 and flows directly to step 1004. The configuration optimizer 122, at step 1004, selects an initial query configuration. The configuration optimizer 122, at step 1006, creates polynomials for the number of instructions per unit of time as a function of the input rate for each logical node, as described above in the section entitled "Exemplary Constraints Considered During Evaluation". The configuration optimizer 122, at step 1008, creates a system of inequalities that are derived from constraints associated with the configuration. The configuration optimizer 122, at step 1010, solves the system of inequalities. The configuration optimizer 122, at step 1012, returns the maximal input ate of the configuration that satisfies the system of inequalities. This allows for the configuration optimizer 122 to determine how the configuration compares with other configurations. Once the configuration optimizer 122 is able to compare the configurations it can identify the configuration that maximizes the throughput of the system. The control flow then exits at step 1014.

Non-Limiting Examples

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for optimizing throughput of a stream processing system, the method comprising:
executing, with a processor on an information processing system, the following:
analyzing a set of input streams;
creating, based on the analyzing, an input profile for at least one input stream in the set of input streams, wherein the input profile comprises at least a set of processing requirements associated with the input stream;

generating a search space, based on an initial configuration, comprising a plurality of configurations associated with the input stream; and identifying a configuration in the plurality of configurations that increases throughput more than the other configurations in the plurality of configurations based on at least one of the input profile, and system resources, wherein throughput is an input rate that can be processed in a given unit of time, and wherein identifying a configuration further comprises evaluating at least two configurations in the plurality of configurations based on at least one constraint, wherein the evaluating comprises:

for each of the at least two configurations, creating a set of polynomials for a number of instructions per unit of time as a function of an input rate for each logical node within the configuration, wherein the input rate is constant;

creating a system of inequalities that are derived from the at least one constraint;

solving the system of inequalities; and returning a maximal input rate of the configuration that satisfies the system of inequalities.

2. The method of claim 1, wherein the input profile defines a set of values, wherein each value is associated with a maximum input rate that the input stream expects to reach.

3. The method of claim 2, wherein the identifying, further comprises:

determining a quality rating of each throughput rate associated with each of the configurations, wherein the quality rating is the ratio of the throughput rate and an input rate associated with the input stream.

4. The method of claim 1, wherein the generating the search space further comprises:

applying a plurality of one-step moves from the initial configuration resulting in a plurality of neighboring configurations associated with the initial configuration; and applying a plurality of one-step moves from each of the neighboring configurations resulting in a plurality of neighboring configurations associated with each of the neighboring configurations associated with the initial configuration.

5. The method of claim 4, wherein each of the one-step moves is at least one of a logical move of operators, and a physical move of one or more operators.

6. The method of claim 1, wherein the identifying, further comprises:

traversing the search space using at least one metaheuristic.

7. The method of claim 6, wherein the one metaheuristic is at least one of:

Tabu Search;

Reactive Tabu Search; and

Simulated Annealing.

8. The method of claim 1, wherein the identifying, further comprises selecting the initial configuration as a current configuration;

determining a throughput rate associated with the initial configuration;

selecting a neighboring configuration associated with the initial configuration;

determining a throughput rate associated with the neighboring configuration;

comparing the throughput rate associated with the initial configuration to the throughput rate associated with the neighboring configuration;

determining, based on the comparing, if the neighboring configuration increases throughput based on at least the input profile and system resources more than the initial configuration;

if the neighboring configuration does increase throughput more than the initial configuration;

selecting the neighboring configuration as the current configuration; and if the neighboring configuration fails to increase throughput more than the initial configuration;

selecting another configuration to be compared to the initial configuration.

9. The method of claim 8, wherein the identifying further comprises:

comparing the current configuration with another configuration in the plurality of configurations;

selecting one of the current configuration and the another configuration to be the current configuration based on which configuration increases throughput based on at least the input profile and system resources more; and repeating the comparing and selecting until the current configuration increases throughput based on at least the input profile and system resources more than any other configuration in the plurality of configurations.

10. The method of claim 8, wherein the configuration is one of a neighboring configuration associated with the initial configuration and a configuration selected from a random location within the search space.

11. A system for optimizing throughput of a stream processing system, the system comprising:

at least one information processing system, wherein the information processing system comprises:

at least one processor;

a memory communicatively couple to the processor; and a configuration optimizer, wherein the configuration optimizer is configured to perform a method comprising:

analyzing a set of input streams;

creating, based on the analyzing, an input profile for at least one input stream in the set of input streams, wherein the input profile comprises at least a set of processing requirements associated with the input stream;

generating a search space, based on an initial configuration, comprising a plurality of configurations associated with the input stream; and identifying a configuration in the plurality of configurations that increases throughput more than the other configurations in the plurality of configurations based on at least one of the input profile, and system resources, wherein throughput is an input rate that can be processed in a given unit of time, and wherein identifying a configuration further comprises evaluating at least two configurations in the plurality of configurations based on at least one constraint, wherein the evaluating comprises:

for each of the at least two configurations, creating a set of polynomials for a number of instructions per unit of time as a function of an input rate for each logical node within the configuration, wherein the input rate is constant;

creating a system of inequalities that are derived from the at least one constraint;

solving the system of inequalities; and
returning a maximal input rate of the configuration that satisfies the system of inequalities.

12. The system of claim 11, wherein the identifying by the configuration optimizer further comprises:
determining a quality rating of each throughput rate associated with each of the configurations, wherein the quality rating is the ratio of the throughput rate and an input rate associated with the input stream.

13. The system of claim 11, wherein the generating the search space by the configuration optimizer further comprises:
applying a plurality of one-step moves from the initial configuration resulting in a plurality of neighboring configurations associated with the initial configuration; and
applying a plurality of one-step moves from each of the neighboring configurations resulting in a plurality of neighboring configurations associated with each of the neighboring configurations associated with the initial configuration.

14. The system of claim 11, wherein the identifying by the configuration optimizer, further comprises
selecting the initial configuration as a current configuration;
determining a throughput rate associated with the initial configuration;
selecting a neighboring configuration associated with the initial configuration;
determining a throughput rate associated with the neighboring configuration;
comparing the throughput rate associated with the initial configuration to the throughput rate associated with the neighboring configuration;
determining, based on the comparing, if the neighboring configuration increases throughput based on at least the input profile and system resources more than the initial configuration;
if the neighboring configuration does increase throughput more than the initial configuration;
selecting the neighboring configuration as the current configuration; and
if the neighboring configuration fails to increase throughput more than the initial configuration;
selecting another configuration to be compared to the initial configuration.

15. The system of claim 14, wherein the identifying by the configuration optimizer further comprises:
comparing the current configuration with another configuration in the plurality of configurations;
selecting one of the current configuration and the another configuration to be the current configuration based on which configuration increases throughput based on at least the input profile and system resources more; and
repeating the comparing and selecting until the current configuration increases throughput based on at least the input profile and system resources more than any other configuration in the plurality of configurations.

16. A non-transitory computer readable storage medium for optimizing throughput of a stream processing system, the non-transitory computer readable storage medium comprising instructions for:
analyzing a set of input streams;
creating, based on the analyzing, an input profile for at least one input stream in the set of input streams, wherein the input profile comprises at least a set of processing requirements associated with the input stream;
generating a search space, based on an initial configuration, comprising a plurality of configurations associated with the input stream; and
identifying a configuration in the plurality of configurations that increases throughput more than the other configurations in the plurality of configurations based on at least one of
the input profile, and
system resources,
wherein throughput is an input rate that can be processed in a given unit of time, and
wherein identifying a configuration further comprises evaluating at least two configurations in the plurality of configurations based on at least one constraint, wherein the evaluating comprises:
for each of the at least two configurations, creating a set of polynomials for a number of instructions per unit of time as a function of an input rate for each logical node within the configuration, wherein the input rate is constant;
creating a system of inequalities that are derived from the at least one constraint;
solving the system of inequalities; and
returning a maximal input rate of the configuration that satisfies the system of inequalities.

17. The non-transitory computer readable storage medium of claim 16, wherein the instructions for identifying further comprise instructions for:
determining a quality rating of each throughput rate associated with each of the configurations, wherein the quality rating is the ratio of the throughput rate and an input rate associated with the input stream.

18. The non-transitory computer readable storage medium of claim 16, wherein the instructions for generating the search space further comprise instructions for:
applying a plurality of one-step moves from the initial configuration resulting in a plurality of neighboring configurations associated with the initial configuration; and
applying a plurality of one-step moves from each of the neighboring configurations resulting in a plurality of neighboring configurations associated with each of the neighboring configurations associated with the initial configuration.

19. The non-transitory computer readable storage medium of claim 16, wherein the instructions for identifying further comprise instructions for:
selecting the initial configuration as a current configuration;
determining a throughput rate associated with the initial configuration;
selecting a neighboring configuration associated with the initial configuration;
determining a throughput rate associated with the neighboring configuration;
comparing the throughput rate associated with the initial configuration to the throughput rate associated with the neighboring configuration;
determining, based on the comparing, if the neighboring configuration increases throughput based on at least the input profile and system resources more than the initial configuration;
if the neighboring configuration does increase throughput more than the initial configuration;
selecting the neighboring configuration as the current configuration; and
if the neighboring configuration fails to increase throughput more than the initial configuration;

selecting another configuration to be compared to the initial configuration.

20. The non-transitory computer readable storage medium of claim 19, wherein the instructions for identifying further comprise instructions for:
- comparing the current configuration with another configuration in the plurality of configurations;
- selecting one of the current configuration and the another configuration to be the current configuration based on which configuration increases throughput based on at least the input profile and system resources more; and
- repeating the comparing and selecting until the current configuration increases throughput based on at least the input profile and system resources more than any other configuration in the plurality of configurations.

* * * * *